US011269520B2

United States Patent
Subramanian et al.

(10) Patent No.: US 11,269,520 B2
(45) Date of Patent: *Mar. 8, 2022

(54) METHODS TO CONFIGURE AND ACCESS SCALABLE OBJECT STORES USING KV-SSDS AND HYBRID BACKEND STORAGE TIERS OF KV-SSDS, NVME-SSDS AND OTHER FLASH DEVICES

(71) Applicant: Samsung Electronics Co., Ltd., Suwon-si (KR)

(72) Inventors: Anand Subramanian, San Jose, CA (US); Oscar Prem Pinto, San Jose, CA (US)

(73) Assignee: SAMSUNG ELECTRONICS CO., LTD.

( * ) Notice: Subject to any disclaimer, the term of this patent is extended or adjusted under 35 U.S.C. 154(b) by 105 days.

This patent is subject to a terminal disclaimer.

(21) Appl. No.: 16/776,497

(22) Filed: Jan. 29, 2020

(65) Prior Publication Data
US 2020/0167082 A1    May 28, 2020

Related U.S. Application Data

(63) Continuation of application No. 15/881,706, filed on Jan. 26, 2018, now Pat. No. 10,572,161.

(Continued)

(51) Int. Cl.
*G06F 3/06* (2006.01)
*G06F 15/173* (2006.01)

(52) U.S. Cl.
CPC .......... *G06F 3/0611* (2013.01); *G06F 3/0659* (2013.01); *G06F 3/0661* (2013.01);

(Continued)

(58) Field of Classification Search
CPC ..................................................... G06F 3/0611

(Continued)

(56) References Cited

U.S. PATENT DOCUMENTS

| 7,096,213 B2 * | 8/2006 | Chatterjee ............. G06F 16/252 |
| 10,387,255 B2 | 8/2019 | Zeng |

(Continued)

FOREIGN PATENT DOCUMENTS

| CN | 101252788 A | 8/2008 |
| CN | 104618484 A | 5/2015 |

(Continued)

OTHER PUBLICATIONS

Amazon Web Services, Inc. (AWS), "AWS Storage Services Overview", Dec. 2016, found via Google (https://d0.awsstatic.com/whitepapers/AWS%20Storage%20Services%20Whitepaper-v9.pdf), 54 pages.

(Continued)

*Primary Examiner* — Jae U Yu
(74) *Attorney, Agent, or Firm* — Renaissance IP Law Group LLP

(57) ABSTRACT

A system is disclosed. The system may include a computer system, which may include a processor that may execute instructions of an application that accesses an object using an object command, and a memory storing the instructions of the application. The computer system may also include a conversion module to convert the object command to a key-value (KV) command. Finally, the system may include a storage device storing data for the object and processing the object using the KV command.

19 Claims, 13 Drawing Sheets

Related U.S. Application Data

(60) Provisional application No. 62/586,809, filed on Nov. 15, 2017.

(52) U.S. Cl.
CPC ...... *G06F 3/0679* (2013.01); *G06F 15/17331* (2013.01); *G06F 2212/2022* (2013.01)

(58) Field of Classification Search
USPC ......................................................... 711/103
See application file for complete search history.

(56) References Cited

U.S. PATENT DOCUMENTS

| | | | |
|---|---|---|---|
| 10,705,974 | B2 | 7/2020 | Qiu et al. |
| 2014/0136758 | A1 | 5/2014 | Sprouse et al. |
| 2016/0099810 | A1 | 4/2016 | Li et al. |
| 2016/0293274 | A1* | 10/2016 | Schuh .................... G11C 29/16 |
| 2017/0177222 | A1 | 6/2017 | Singh et al. |

FOREIGN PATENT DOCUMENTS

| | | | |
|---|---|---|---|
| CN | 104731785 | A | 6/2015 |
| CN | 106662983 | A | 5/2017 |
| CN | 107209644 | A | 9/2017 |

OTHER PUBLICATIONS

An, Zhongqi, et al., "Optimizing the Datapath for Key-value Middleware with NVMe SSDs over RDMA Interconnects", 2017 IEEE International Conference on Cluster Computing, 2017, found via Google Scholar and IEEE Xplore (http://ieeexplore.ieee.org/document/8048972/), 5 pages.

Butler, Brandon, "Deep Dive on AWS vs. Azure vs. Google Cloud Storage Options", Network World, Apr. 24, 2017, found via Google (https://www.networkworld.com/article/3191520/deep-dive-on-aws-vs-azure-vs-google-cloud-storage-options.html), 8 pages.

Jiang, Wanchun et al., "Performance Analysis and Improvement of Replica Selection Algorithms for Key-Value Stores", 2017 IEEE 10th International Conference on Cloud Computing, 2017, 4 pages.

Notice of Allowance for U.S. Appl. No. 15/881,706, dated Oct. 17, 2019.

Office Action for U.S. Appl. No. 15/881,706, dated Jul. 25, 2019.

Openstack, "Large Objects", Oct. 3, 2017, found via Google (https://docs.openstack.org/swift/latest/api/large_objects.html), 6 pages.

Wu, Chin-Hsien, et al., "An Efficient B-Tree Layer for Flash-Memory Storage Systems," ACM Transactions on Embedded Computing Systems 6(3), Jul. 2007, 20 pages.

Zhang, Yiming, et al., "CubeX: Leveraging Glocality of Cube-Based Networks for RAM-Based Key-Value Store", IEEE INFOCOM 2017—IEEE Conference on Computer Communications, The 36th Annual IEEE International Conference, 2017, found via IEEE Xplore (http://ieeexplore.ieee.org/document/8057151/), 9 pages.

* cited by examiner

METHODS TO CONFIGURE AND ACCESS SCALABLE OBJECT STORES USING KV-SSDS AND HYBRID BACKEND STORAGE TIERS OF KV-SSDS, NVME-SSDS AND OTHER FLASH DEVICES

RELATED APPLICATION DATA

This application is a continuation of U.S. patent application Ser. No. 15/881,706, filed Jan. 26, 2018, now U.S. Pat. No. 10,572,161, issued Feb. 25, 2020, which claims the benefit of U.S. Provisional Patent Application Ser. No. 62/586,809, filed Nov. 15, 2017, which is incorporated by reference herein for all purposes.

FIELD

The inventive concepts relate generally to storage devices, and more particularly to improving using object stores as backend storage.

BACKGROUND

Object storage has become one of the most important aspects of today's storage solutions and challenges. Object storage has become the preferred mode of storage for many applications due to factors such as non-hierarchical layouts resulting in better scalability, faster retrieval times, inherent simplicity in the access protocols, and greater overall cost-effectiveness. Traditional storage stacks, using hard disk drives and conventional file systems, were modified to accommodate object storage and their Application Programming Interfaces (APIs), but such traditional storage stacks were not optimized for object storage and access due to the complexities of generic file-system layers, multi-protocol handling (Network File System (NFS), Server Message Block (SMB), and/or block access, for example), distributed locking, etc. While the use of object APIs and their storage has been exploding, especially with the advent of the Cloud and an ecosystem of Cloud Service Providers (CSPs), existing stacks do not sufficiently leverage the object format and its simplicity to achieve the best scale and performance versus cost ratios possible.

A need remains for a way to use object storage to offer better access and cost-effectiveness.

DETAILED DESCRIPTION

Figure 1:
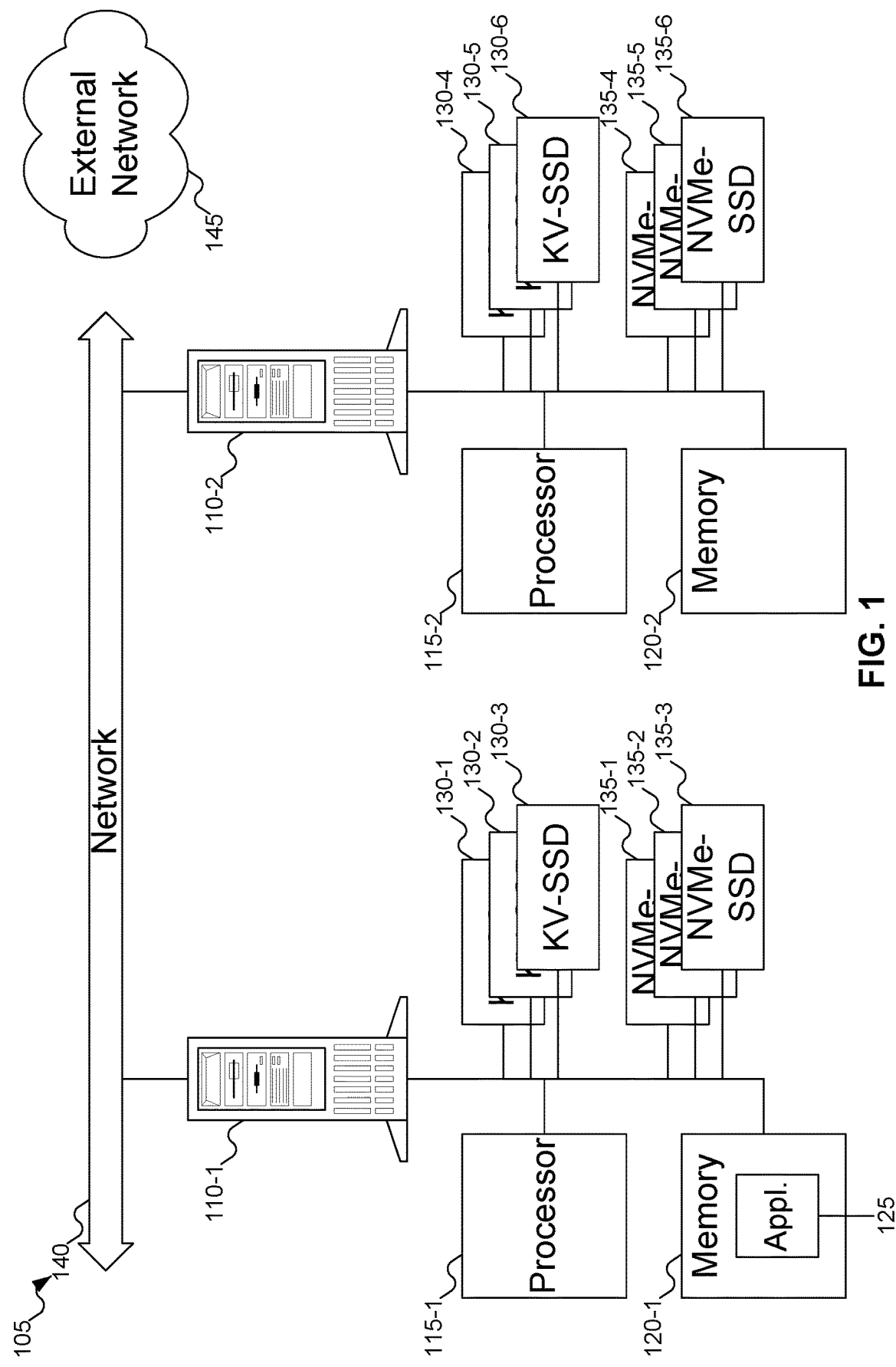
FIG. 1 shows networked machines including various Solid State Drives (SSDs) that may use Key-Value (KV) commands to process object commands, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Object stores place requirements of scalable, consistently high-performance demands on storage systems. Embodiments of the inventive concept leverage and integrate object storage systems with Key-Value (KV) Solid State Drives (SSDs) and Non-Volatile Memory Express (NVMe)-SSDs in a backend storage system, enabling a scalable high-performance object store, which has benefits for many applications, such as running analytics on objects and video surveillance data analysis. Embodiments of the inventive concept may support KV-SSDs, NVMe-SSDs, hybrid devices, or any combination thereof as backend devices.

If the data is stored across a network, such as Remote Direct Memory Access (RDMA) fabric, KV-commands (i.e., object requests from the application layer) may be sent over NVMe over Fabric (NVMeoF) by encapsulating host KV commands in NVMe commands and sending them over the RDMA fabric. The other end of the network may represent a storage node (also called a target node) with or without compute, and should be able to decode the RDMA packets and NVMe commands to retrieve the piggybacked KV-commands. Thus, the storage target would need the intelligence to translate NVMe vendor commands to KV commands. The KV commands may then be handled by the regular KV-SSD vendor's device drivers and any additional mapping layers exported by the device vendor.

In one embodiment of the inventive concept, an object command may be converted to a KV tuple form that may then be stored on any form of KV device. In-memory plugins and associated KV-bindings may take assist in the conversion from the account/container/object identifier (ID) and associated metadata format to a simpler access URL/path that may be used as a key. For example, the plugin may remove any associated metadata dependency when it tries to GET an object. The in-memory plugin may be a completely in-memory driver that is intended for higher performance and exploitation of SSD devices in the backend. Additionally the in-memory plugin may be made intelligent in the future by leveraging hints and device attributes as they are exported by the KV-SSDs. Using such information may permit satisfying object Quality of Service (QoS) QoS requests and Service Level Agreements (SLAs) imposed by applications and helping with better placement of object data in the devices.

Another embodiment of the inventive concept may leverage NVMe-SSDs in the backend storage to enable the object store to convert object commands to KV commands and then storing the key-value pairs on NVMe-SSD block devices. In such embodiments of the inventive concept, the in-memory plugin and the KV-bindings remain the same as before. After the object commands have been converted into their corresponding KV commands, they may either be handled by a vendor-provided KV-Application Programming Interface (API) layer which may then talk to a common KV-SHIM for different backend devices, or the KV-bindings layer may pass the KV-command to a KV-NVMe driver in user-space that enables conversion of the KV commands to be stored on NVMe-SSD devices.

In such embodiments of the inventive concept, the KV-APIs enable the key value commands to be converted/mapped appropriately and be stored on NVMe-SSDs. In this case the key-value pairs are hashed based on the key and converted to a suitable [<LBA, offset>, len] value. The LBA to which the key hashes is guaranteed by the hashing algorithm to be a consistent one. The offset accounts for any metadata for the object that may be stored at the LBA. Beyond the offset within the LBA, the associated value is written to the device. The object get or read follows the reverse of the write behavior. The hashing or mapping algorithm is assumed to be elastic in nature so that the system may scale appropriately as more NVMe-SSDs are attached to the node and the algorithm may accommodate mapping keys across all old and newly added devices in a consistent and balanced manner. It is possible to do this using well-known algorithms (or their variants) like the Davies-Meyer algorithm.

In yet another embodiment of the inventive concept, objects may be accessed from remote KV-SSDs and/or NVME-SSDs: that is, device backends that are non-local and accessible across a network. One implementation may include a storage target node (henceforth referred to simply as a target) with compute and several NVMe-SSDs attached via PCIe. Such embodiments of the inventive concept may introduce an additional software layer to map KV commands to NVMe vendor commands, which sits below the KV-SHIM (the common KV API on host side) and KV-API provided by the vendor. This mapping layer may convert the KV commands to NVMe commands that are then encapsulated to be transmitted over RDMA fabric using NVMe-oF.

The target side similarly decodes the NVMe-oF command and then the NVMe command. At this point the KV-request may be further decoded from the NVMe command and passed to the vendor provided KV-device APIs to be written to KV-SSDs. Alternately the KV commands may be passed to the KV-NVMe driver to be written to NVMe-SSDs, as discussed above.

In yet another embodiment of the inventive concept, hybrid devices may be used in the backend storage. For example, the mapping or hashing software layer described above may be used as a simple lookup layer that may use KV APIs to store any object storage metadata in KV-SSDs. This layer would use the vendor provided KV API to store each key on a tier of limited KV-SSD devices (called the metadata lookup tier) and the value would be the location of the object on another tier of NVMe-SSDs (called the object data tier). These embodiments of the inventive concept provide two advantages. First, the object store backend may be scaled indefinitely, since the hashed location of a key may span across devices that are locally attached or even attached to remote nodes (peers of the target storage node). Second, use of NVMe-SSDs to store the data avoids limitations on object size that may be imposed by using KV-SSDs as the backend. For example, an object that is larger than a backend device may be broken up into multiple chunks, each of which may be stored on different NVMe-SSD devices as required. The metadata, which may be stored in a KV-SSD, may store the locations of all chunks associated with the object. Replication is assumed to be handled by the application.

Disaggregated object storage over a network fabric involves three modules that serve three important functions: converting an object command and associated accounts, containers, or buckets into a KV command; encapsulating a KV command for transmission over a fabric network; and extracting an object command and convert into one or more KV and NVMe commands.

To covert an object command to a KV command, an object ID, and potentially the access path or URL for the object (i.e., the account, container, or bucket) may be hashed to a value which may be used as the corresponding key in the KV device context. Example hash functions may include uniformly distributed hash functions such as SHA1 and SHA2. The result of the hash function may be a key of certain bit length which may then be the key to store the object data. The key may hold the metadata, which may in turn include more key values to provide further indirect access to larger metadata as applicable. Once an object command has been converted to a key-value pair, KV commands may be applied on the corresponding object. The mapping above and other management functions may be handled by the KV-plugin and driver layers. For example, all objects belonging to the same account may be stored in the same container at the device level: that is, each account may be logically mapped to a KV-SSD container. Each container belonging to an account in the object store may be mapped to a KV group belonging to a KV container within a KV-SSD. Such conversion may not only refine the mapping of objects to KV pairs, but may also help implement important features like built-in QoS: for example, by providing the object tenants device-level isolation of tenant data.

To encapsulate a KV command into a network fabric command, the KV command may be converted to an extended NVMe command or a vendor specific command. This new command may be attached as a payload to an RDMA fabric command.

Extracting a KV command from an RDMA fabric comment is the reverse: the RDMA fabric payload may be extracted and converted to an extended NVMe command or a vendor specific command, which may then be converted to a KV command. The KV command may include embedded object level information that will map to KV and NVMe block devices. The KV command may contain additional attributes like offset/length within an object. The RDMA fabric command may contain more than one KV command in the same request as one atomic operation. The converted KV command may then be sent to a storage device, or converted to one or more KV commands, or converted one or more KV commands and one or more NVMe commands. The commands may then be sent to storage devices and the responses processed accordingly. The commands may be sent to a KV storage device, to a KV Library driver infrastructure, or converted to associated NVMe commands and sent to an NVMe driver.

Small objects might result in a single KV command, or one or more KV commands and an NVMe command. Additional metadata may be stored/retrieved from a KV-SSD with data from an NVMe-SSD.

Large Objects might result in one or more KV commands and one or more NVMe commands. The metadata may be complex and spread across multiple KV devices. The data may be large and may be greater than the size of the NVMe device, and may use block striping for performance.

FIG. 1 shows system 105 of networked machines including various Solid State Drives (SSDs) that may use Key-Value (KV) commands to process object commands, according to an embodiment of the inventive concept. In FIG. 1, computer systems 110-1 and 110-2 are shown. While FIG. 1 shows only two computer systems, embodiments of the inventive concept may support any number of computer systems that may process object commands using Key Value (KV) commands.

Each of computer systems 110-1 and 110-2 may include processors 115-1 and 115-2, respectively, and memory 120-1 and 120-2, respectively. Among other uses, processors 115-1 and 115-2 may execute applications, such as application 125, which may be stored in memories 120-1 and 120-2. Processors 115-1 and 115-2 may be any variety of processor: for example, an Intel Xeon, Celeron, Itanium, or Atom processor, an AMD Opteron processor, an ARM processor, etc. While FIG. 1 shows a single processor in each of computer systems 110-1 and 110-2, computer systems 110-1 and 110-2 may each include any number of processors, each of which may be single core or multi-core processors. Memories 120-1 and 120-2 may each be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memories 120-1 and 120-2 may each also be any desired combination of different memory types. Memories 120-1 and 120-2 may be controlled by a memory controller (not shown in FIG. 1), also part of computer systems 110-1 and 110-2.

Computer systems 110-1 and 110-2 may each also include storage devices. For example, computer system 110-1 is shown as including KV-Solid State Drives (SSDs) 130-1, 130-2, and 130-3, and Non-Volatile Memory Express (NVMe)-SSDs 135-1, 135-2, and 135-3, and computer system 110-2 is shown as including KV-SSDs 130-4, 130-5, and 130-6 and NVMe-SSDs 135-4, 135-5, and 135-6. While FIG. 1 shows computer systems 110-1 and 110-2 each including three KV-SSDs and three NVMe-SSDs, embodiments of the inventive concept may include computer systems each with any number of KV-SSDs (including zero) and any number of NVMe-SSDs (also including zero). Storage devices 130-1, 130-2, 130-3, 130-4, 130-5, 130-6, 135-1, 135-2, 135-3, 135-4, 135-5, and 135-6 may act as backend stores for objects used by applications like application 125. Storage devices 130-1, 130-2, 130-3, 130-4, 130-5, 130-6, 135-1, 135-2, 135-3, 135-4, 135-5, and 135-6 may be configured in any desired manner. For example, NVMe-SSDs 135-1, 135-2, 135-3, 135-4, 135-5, and 135-6 may be configured as individual disks, in a Redundant Array in Independent Disks (RAID) array, or as Just a Bunch of Flash (JBOF), among other possibilities. While FIG. 1 shows KV-SSDs 130-1, 130-2, 130-3, 130-4, 130-5, and 130-6 and NVMe-SSDs 135-1, 135-2, 135-3, 135-4, 135-5, and 135-6 as separate devices, embodiments of the inventive concept may also support hybrid devices that offer the functionality of multiple different storage devices. For example, a hybrid storage device may offer the functionality of both KV-SSDs and NVMe-SSDs, the advantages of which are discussed further below with reference to FIGS. 5A-5C.

Computer systems 110-1 and 110-2 are shown connected via network 140. Using network 140, application 125 may interact with objects stored in storage devices 135-1, 135-2, 135-3, 135-4, 135-5, and 135-6 on computer system 110-2. Network 140 also connects to external network 145. External network 145 may be type of network, including another Local Area Network (LAN), a Wide Area Network (WAN), or a global network such as the Internet. Applications like application 125 may then interact with objects stored in storage devices accessible via external network 145, as permitted by local policy.

Although FIG. 1 depicts computer systems 110-1 and 110-2 as servers, embodiments of the inventive concept may include computer systems 110-1 and 110-2 each of any desired type without limitation. For example, computer systems 110-1 and 110-2 each might be a desktop or laptop computer, a server (either a standalone server or a rack server), or any other device that may benefit from embodiments of the inventive concept. Computer systems 110-1 and 110-2 each may also include specialized portable computing devices, tablet computers, smartphones, and other computing devices. Computer systems 110-1 and 110-2 may run any desired applications: database applications and applications that use the Openstack Swift architecture are good examples, but embodiments of the inventive concept may extend to any desired application that uses objects, without being limited to any specific architecture.

Figure 2:
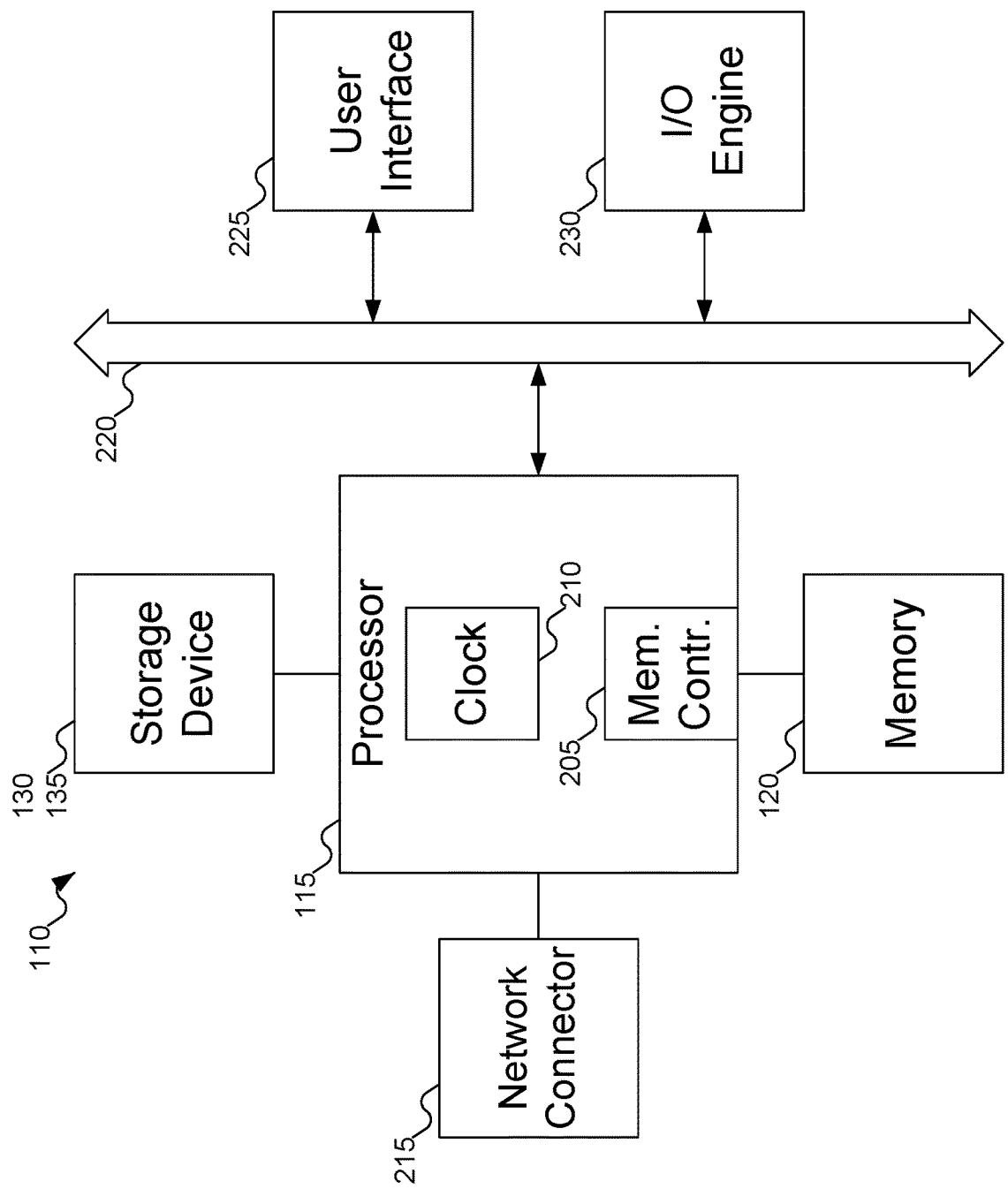
FIG. 2 shows additional details of the machines of FIG. 1.

FIG. 2 shows additional details of computer systems 110-1 and 110-2 of FIG. 1. In FIG. 2, typically, computer system 110 (which may represent either of computer systems 110-1 or 110-2 of FIG. 1) includes one or more processors 115, which may include memory controller 205 and clock 210, which may be used to coordinate the operations of the components of computer system 110. Processors 115 may also be coupled to memory 120, which may include random access memory (RAM), read-only memory (ROM), or other state preserving media, as examples. Processors 115 may also be coupled to storage devices 130 and 135, and to network connector 215, which may be, for example, an Ethernet connector or a wireless connector. Processors 115 may also be connected to a bus 220, to which may be attached user interface 225 and Input/Output interface ports that may be managed using Input/Output engine 230, among other components.

Figure 3:
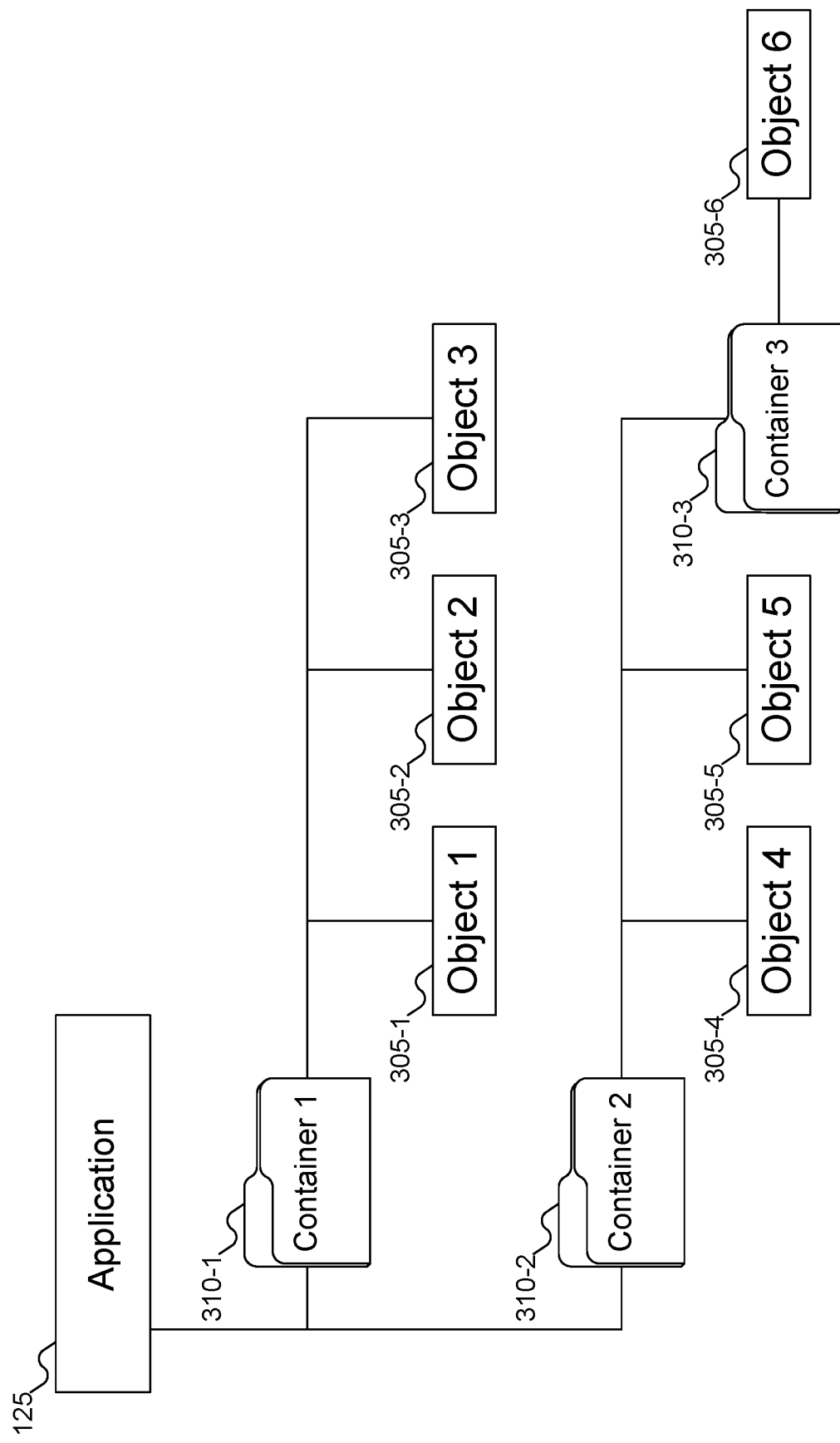
FIG. 3 shows the application of FIG. 1 with various objects organized hierarchically.

FIG. 3 shows the application of FIG. 1 with various objects organized hierarchically. In general, in an object architecture, there are three elements in the architecture: objects, containers, and accounts. The objects are typically unstructured data stores. The objects store data, which may typically be of any length and any format. As far as the storage device is concerned, an object is simply an amount of binary data of any length desired by the application.

Containers (sometimes also called "buckets") are groupings of related objects. How the objects are grouped may be left to the application. For example, in a company, one container might store all the objects relating to the engineering department, another container might store all the objects relating to the human relations department, a third container might store all the objects relating to the finance department, and so on. In theory, containers may nest, to add sub-levels to the hierarchical structure of the object tree.

Accounts collect all objects that belong to the same client. So, all the objects that are associated with company A (and their containers) may be within one account, all the objects that are associated with company B (and their containers) may be within a second account, and so on. The use of accounts and containers help to aid in the organization and management of the objects being stored, but accounts and containers, both individually and collectively, may be omitted without loss of functionality.

Turning to FIG. 3, application 125 is shown as using objects 305-1, 305-2, 305-3, 305-4, 305-5, and 305-6 stored in three containers 310-1, 310-2, and 310-3. So container 310-1 includes objects 305-1, 305-2, and 305-3, container 305-2 includes objects 305-4 and 305-5 along with container 310-3, and container 310-3 includes object 310-6. Embodiments of the inventive concept may support any number of objects in any number of containers. While FIG. 3 does not show any accounts, embodiments of the inventive concept may also include accounts. For example, application 125, as shown in FIG. 3, might represent the objects for just one account, with other accounts using a similar object hierarchy.

Figure 4:
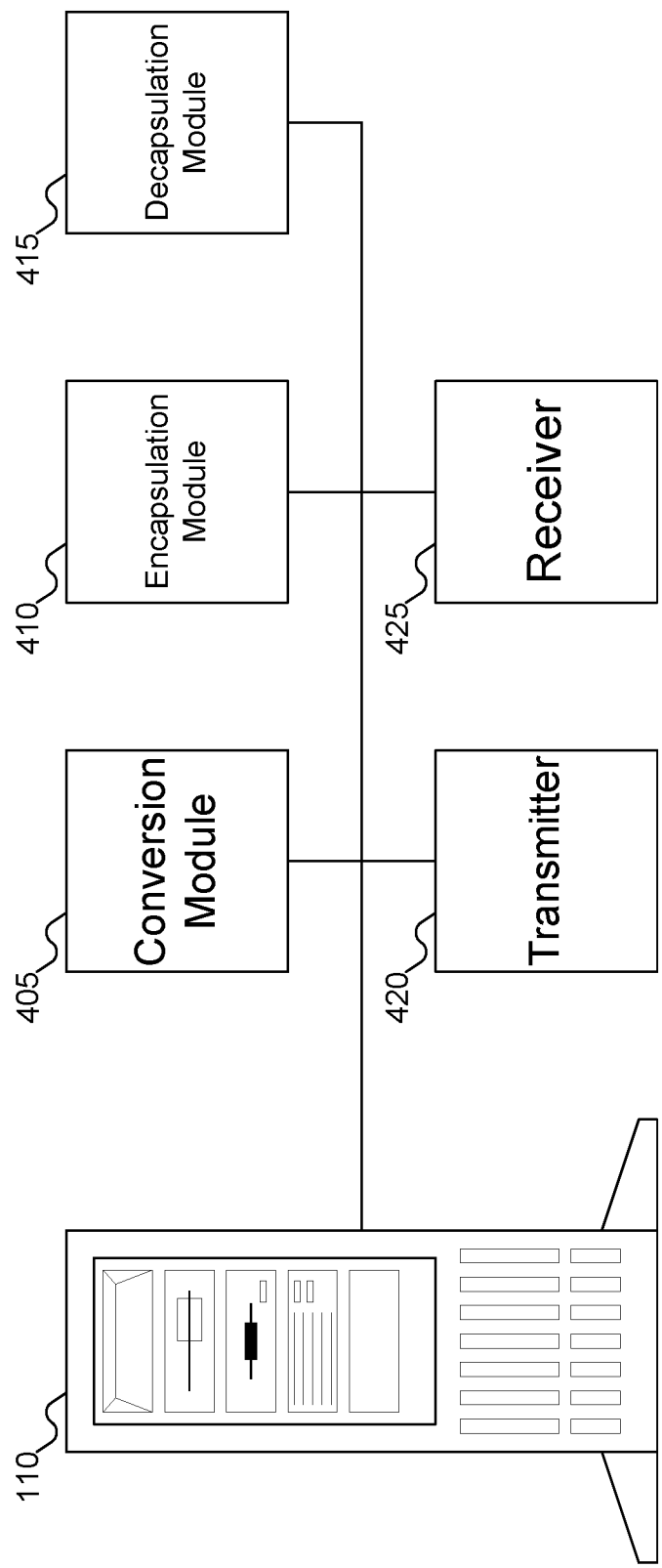
FIG. 4 shows the machines of FIG. 1 including modules to support using KV commands to process object commands.

FIG. 4 shows computer system 110 of FIG. 1 including modules to support using KV commands to process object commands. In FIG. 4, computer system 110 is shown as including conversion module 405, encapsulation module 410, decapsulation module 415, transmitter 420, and receiver 425. Conversion module may convert an object command into a KV command, and from a KV command into an NVMe command, if necessary. Encapsulation module 410 may encapsulate a command (either a KV command or an NVMe command) for transmission to another computer system to access objects remotely. Decapsulation module 415 may decapsulate a command encapsulated by encapsulation module 410. Transmitter 420 and receiver 425 may transmit and receive data, such as encapsulated commands, between computer systems.

Figure 5A:
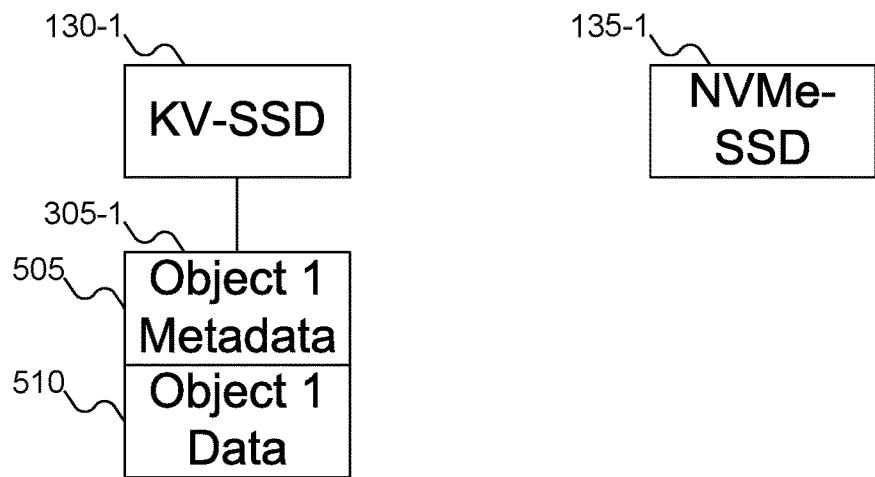
FIGS. 5A-5C show object data and metadata stored on various SSDs of FIG. 1.
Figure 5B:
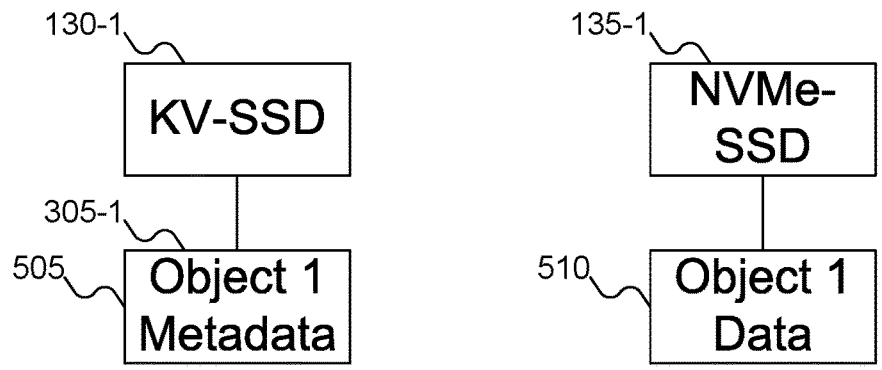
Figure 5C:
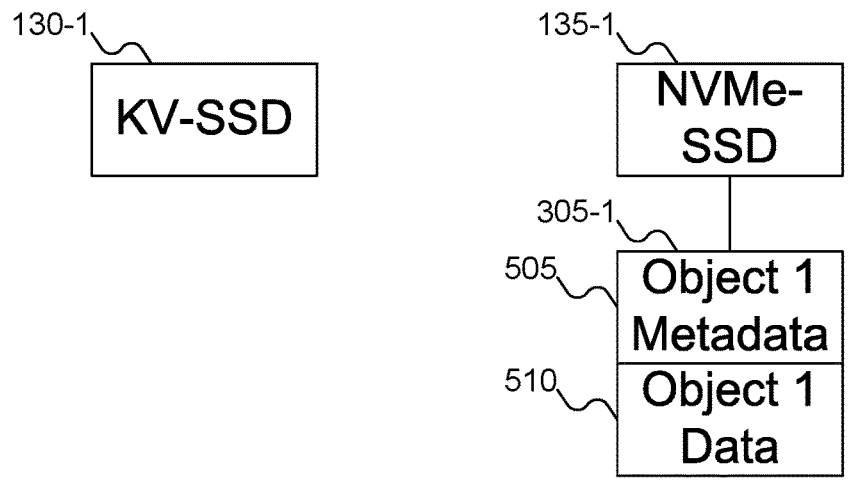

FIGS. 5A-5C show object data and metadata stored on various SSDs of FIG. 1. In FIGS. 5A-5C, KV-SSD 130-1 and NVMe-SSD 135-1 are shown. In FIG. 5A, KV-SS 130-1 stores both object metadata 505 and object data 510. In FIG. 5B, KV-SSD 130-1 store object metadata 505, and NVMe-SSD 135-1 stores object data 510. In FIG. 5C, NVMe-SSD 135-1 stores both object metadata 505 and object data 510. Embodiments of the inventive concept may support any and all of these variations, in any desired combination. In embodiments of the inventive concept like that shown in FIG. 5B, KV-SSD 130-1 may be thought of as a metadata cache layer for the objects.

In addition, while FIGS. 5A-5C shows KV-SSD 130-1 and/or NVMe-SSD 135-1 storing object metadata 505, embodiments of the inventive concept may omit storing object metadata 505. Object metadata 505 may be used to store application and/or system metadata, and also to store metadata used to locate and retrieve object data 510. For example, NVMe-SSD 135-1 may use block addressing, which expects a query to provide a Logical Block Address (LBA) and an offset to locate where the data may be found on NVMe-SSD 135-1. The LBA and offset may be stored in object metadata 505. But when object data 510 is stored on KV-SSD 130-1, no LBA or offset needs to be stored in object metadata 505. So if there is no metadata for the object, then object metadata 505 may be omitted.

Hybrid devices, such as those combining the functionalities of both KV-SSD 130-1 and NVMe-SSD 135-1, may be used in similar manners. Object metadata 505 may be stored using the KV-SSD functionality of the hybrid storage device, and object data 510 may be stored using the NVMe-SSD functionality of the hybrid storage device.

An advantage of storing object data 510 on NVMe-SSD 135-1 is that the object data 510 may be split across multiple NVMe-SSDs 135-1, overcoming the limitation of the physical size of any individual storage device. That is, a single object may exceed the capacity limits of any single NVMe-SSD. (Of course, objects may be split across NVMe-SSDs even when they might fit on a single NVMe-SSD.) Object metadata 505 may store information, such as the LBA and offset of all portions of object data 510 wherever stored. Similar to data, metadata 505 may also be split across multiple storage devices (be they KV-SSDs or NVMe-SSDs). Where data 510 and/or metadata 505 are split across multiple devices, data 510 and/or metadata 505 may be organized in any desired manner. For example, data 510 and/or metadata 505 may be striped across multiple storage devices, which might expedite access of an object (or a portion of an object), as the stripes may be accessed in parallel. Embodiments of the inventive concept may include any desired technique to split data 510 or metadata 505 across multiple storage devices.

In FIG. 5C, where both object metadata 505 and object data 510 are stored on NVMe-SSD 135-1 (and KV-SSD 130-1 is not used), multiple read requests may be needed to access object data 505. For example, after mapping the object ID to a metadata LBA and offset, a first request may be sent to NVMe-SSD 135-1 to retrieve object metadata 510, from which the LBA and offset of the actual data may be retrieved and a second request issued to access object data 505.

In FIGS. 5A-5C, various optimizations are also possible. For example, all data objects belonging to a specific account or a specific container may be stored on a single storage device. Such an optimization simplifies object management, although it does impose a limit on the overall size of object data associated with that account or container (via the physical size of the storage device).

Figure 6:
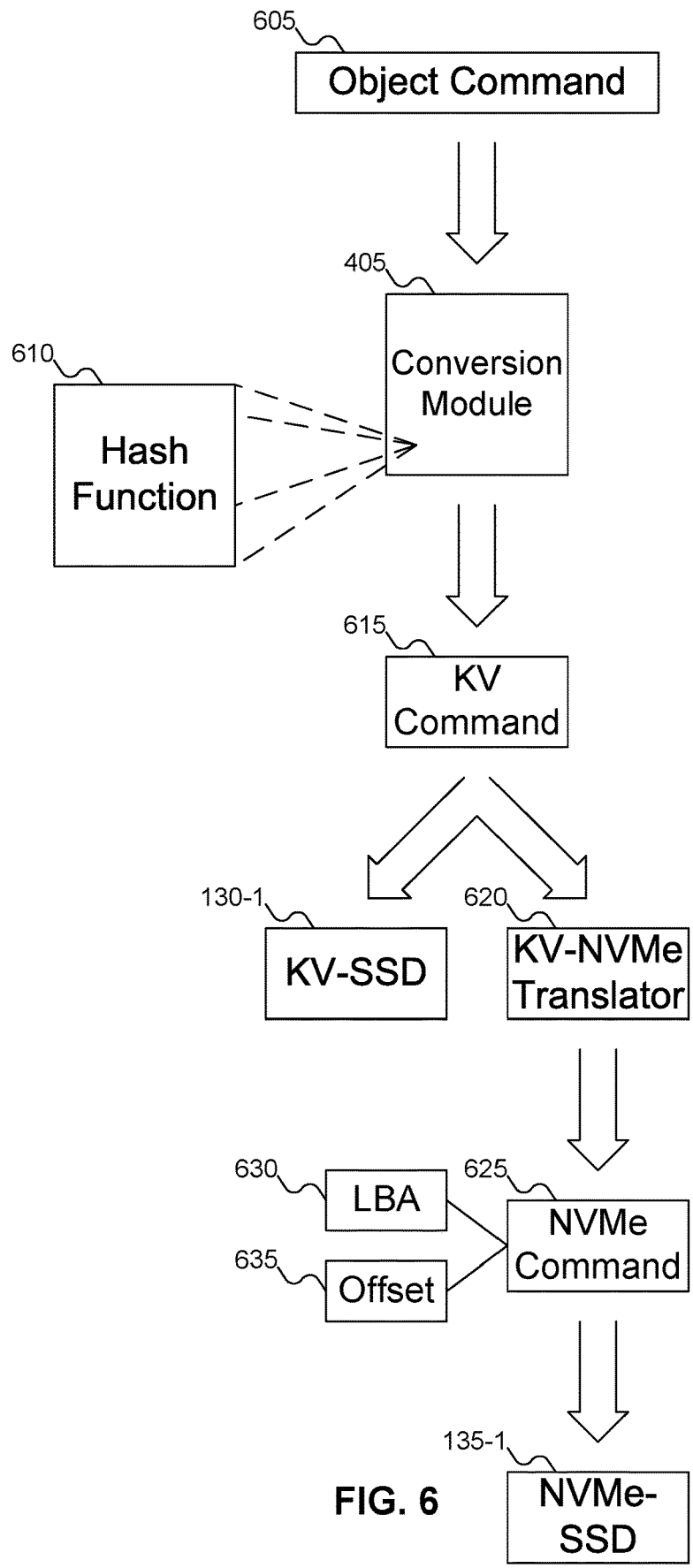
FIG. 6 shows the conversion of an object command to a KV command and/or to a Non-Volatile Memory Express (NVMe) command.

FIG. 6 shows the conversion of an object command to a KV command and/or to a Non-Volatile Memory Express (NVMe) command. In FIG. 6, conversion module 405 may receive object command 605. Using hash function 610, conversion module 405 may map object command 605 to KV command 615. Conversion module 405 may then deliver KV command 615 to KV-SSD 130-1, if the object is stored on KV-SSD 130-1.

KV command 615 may include various attributes. For example, KV command 615 may include an offset and/or data length, which may be used when accessing data from either KV-SSD 130-1 or NVMe-SSD 135-1.

As an alternative to delivering KV command 615 to KV-SSD 130-1, conversion module 405 may deliver KV command 615 to KV-NVMe translator 620, which may translate KV command 615 into NVMe command 625. NVMe translator 620 may use LBA 630 and offset 635 in translating KV command 615 into NVMe command 625. NVMe command 625 may then be delivered to NVMe-SSD 135-1.

KV-NVMe translator 620 may be part of computer system 110-1 of FIG. 1, as the computer system including application 125 of FIG. 1, or it may be part of computer system 110-2 of FIG. 1, as the computer system that retrieves the actual data: both embodiments are included in embodiments of the inventive concept. For example, if the data for the object is stored in a storage device that is part of computer system 110-2 of FIG. 1, then computer system 110-1 of FIG. 1 may send KV command 615 to computer system 110-2 of FIG. 1, leaving it up to computer system 110-2 of FIG. 1 to perform KV-NVMe translation if needed. On the other hand, if computer system 110-1 knows that the data is to be retrieved from an NVMe-SSD, computer system 110-1 of FIG. 1 may perform KV-NVMe translation before sending the (now NVMe) command to computer system 110-2 of FIG. 1.

KV-NVMe translator 620 may be implemented in a KV-SHIM, which may communicate with different backend storage devices. Alternatively, KV-NVMe translator may be implemented as a driver in user-space. Embodiments of the inventive concept are intended to include both of these possibilities, as well as any other ways in which KV-NVMe translator 620 might be implemented. For example, KV-NVMe translator 620 may use a hash table to locate LBA 630 and offset 635 based on the key provided in KV command 615. So long as the hash function used is consistent—that is, the hash function always returns the same LBA and offset given a particular key value—any hash function may be used in this manner. Ideally, the hash function also supports the addition of new storage devices to the backend storage.

Figure 7:
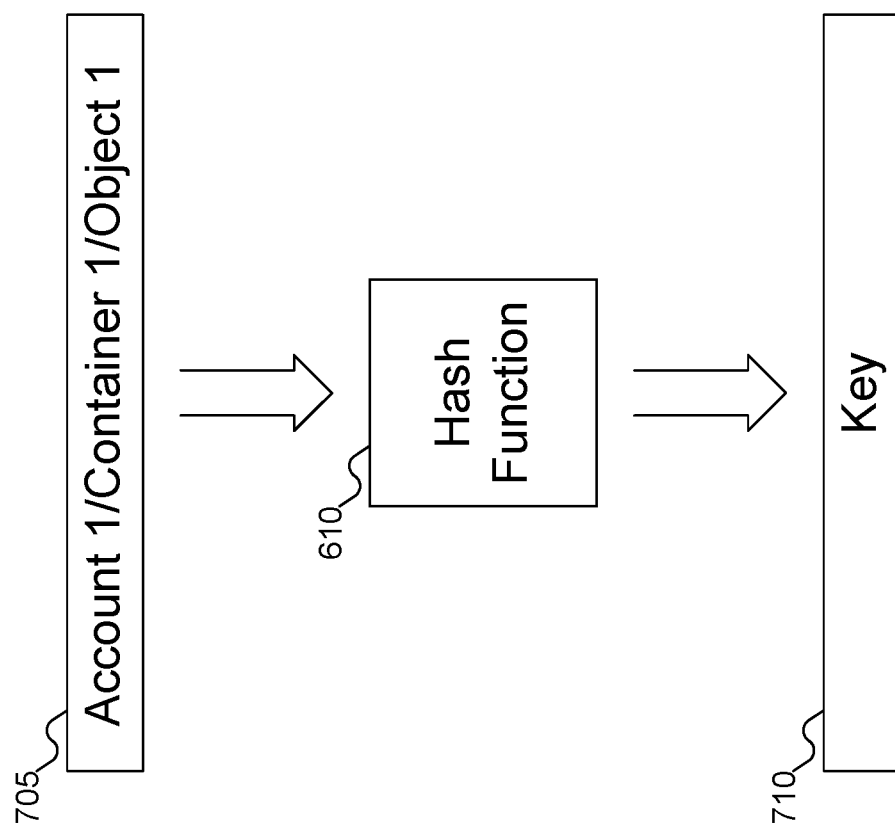
FIG. 7 shows a hash function converting an object identifier (ID) to a key.

FIG. 7 shows hash function 610 converting an object identifier (ID) to a key. In FIG. 7, object ID 705 may include just the object ID itself, or it may also include the path to the object, such as the account and/or container(s) containing the object. Object identifier 705 may be hashed by hash function 610, which may generate key 710. Hash function 705 may be any desired hash function, such as SHA-1 or SHA-2. Hash function may be a uniformly distributed hash function, and should always return the same key when provided the same object ID. Key 710 may then be used as described above with reference to FIG. 6, to access object data 510 of FIG. 5 from KV-SSD 130-1 of FIG. 1, or converted to NVMe command 625 of FIG. 6 to be used to access object data 510 of FIG. 5 from NVMe-SSD 135-1 of FIG. 1.

Figure 8:
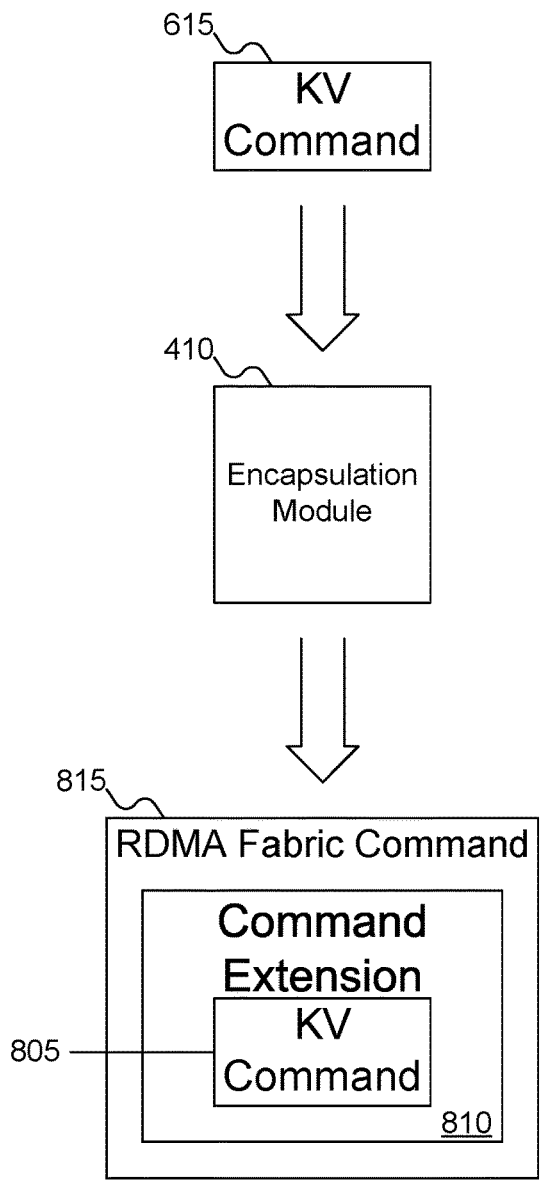
FIG. 8 show a KV command being encapsulated for transmission over a fabric.

FIG. 8 show KV command 615 being encapsulated for transmission over a fabric. In FIG. 8, encapsulation module 410 may convert KV command 615 into command extension 805. Command extension 805 is a term intended to encompass both vendor-specific commands (should the vendor that provided the SSD have custom commands that may be used to access data from the SSD in question) or extended NVMe commands, but may also mean any command that may be used to access data from an appropriate SSD. In this sense, command extension 805 may considered an encapsulation of KV command 615.

Command extension 805 may then be encapsulated as the payload 810 within Remote Direct Memory Access (RDMA) command 815. RDMA command 815 may then be sent across a fabric, such as NVMe over Fabric (NVMeoF) to a remote SSD, where the original KV command may be recovered and processed.

While FIG. 8 shows KV command 615 being encapsulated, embodiments of the inventive concept may support encapsulating any desired command. For example, KV command 615 may be replaced with NVMe command 625 of FIG. 6 for encapsulation.

Figure 9:
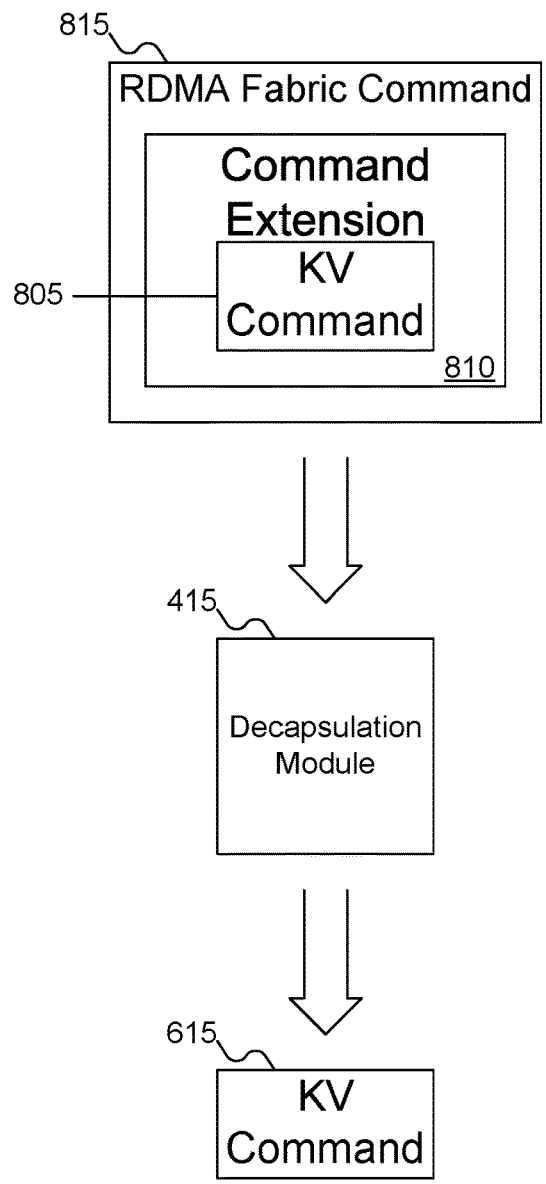
FIG. 9 shows an encapsulated KV command being decapsulated.

FIG. 9 shows encapsulated KV command 805 being decapsulated from RDMA command 815. In FIG. 9, RDMA command 815 may be received by decapsulation module 415. Decapsulation module 415 may then recover command extension 805 from payload 810, and then recover KV command 615 from command extension 805.

As with FIG. 8, in FIG. 9 KV command 615 may be replaced with another command, such as NVMe command 625 of FIG. 6, which may be recovered from RDMA command 815.

Figure 10:
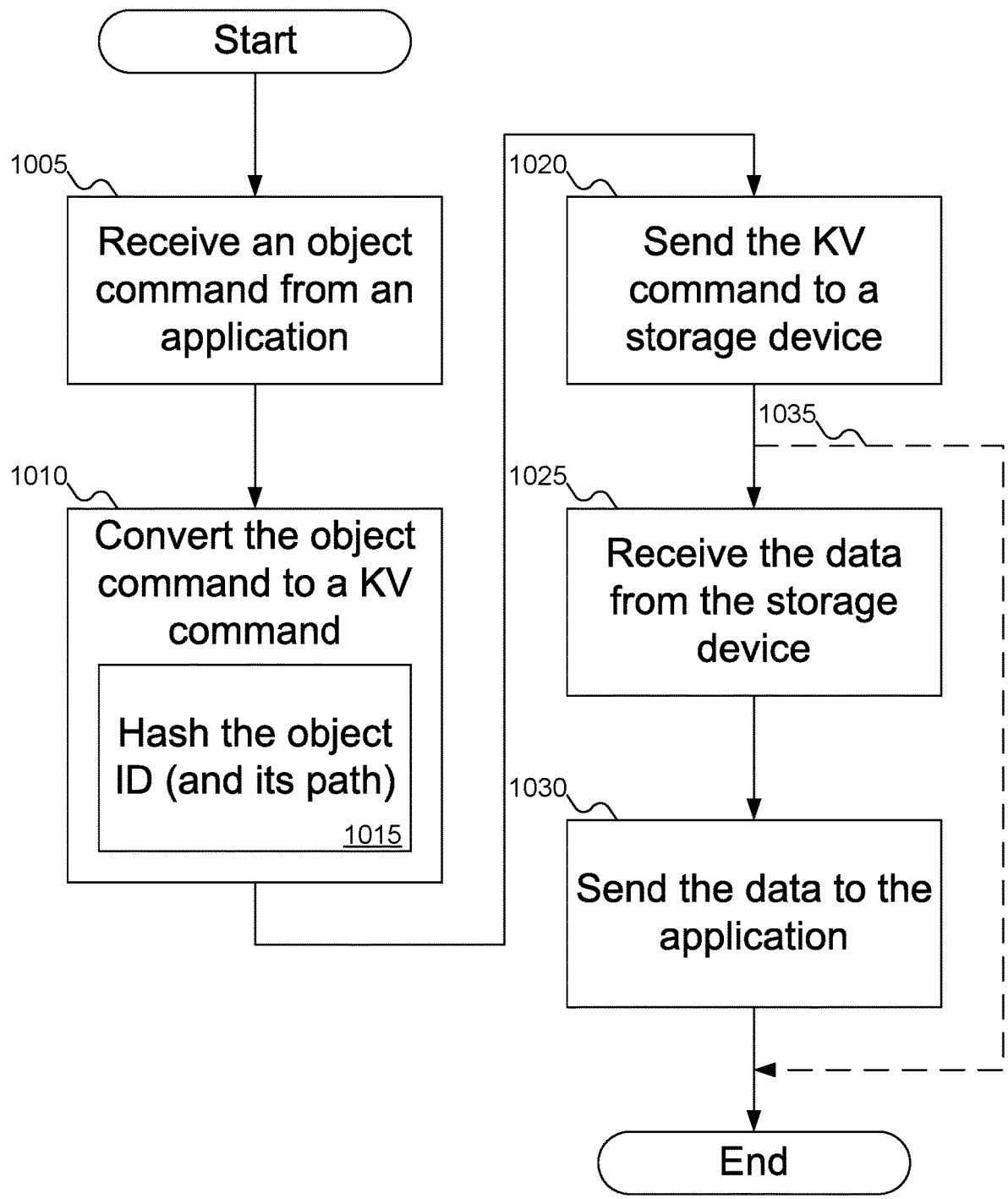
FIG. 10 shows a flowchart of an example procedure to convert an object command to a KV command, according to an embodiment of the inventive concept.

FIG. 10 shows a flowchart of an example procedure to convert object command 605 of FIG. 6 to KV command 615 of FIG. 6, according to an embodiment of the inventive concept. In FIG. 10, at block 1005, conversion module 405 of FIG. 4 may receive object command 605 of FIG. 6 from application 125 of FIG. 1. At block 1010, conversion module 405 of FIG. 4 may convert object command 605 of FIG. 6 to KV command 615 of FIG. 6. This conversion may be done, for example, by hashing object ID 705 (and possibly its path as well) using hash function 610 of FIG. 6, as shown in block 1015. At block 1020, KV command 615 of FIG. 6 may be sent to storage device 130-1 or 135-1 of FIG. 1.

In some embodiments of the inventive concept, such as when object data 510 of FIG. 5 is being read, computer system 110-1 of FIG. 1 may receive object data 510 of FIG. 5 from storage device 130-1 or 135-1 of FIG. 1, as shown at block 1025. Then, at block 1030, computer system 110-1 of FIG. 1 may return object data 510 of FIG. 5 to application 125 of FIG. 1. Blocks 1025 and 1030 are optional, as shown by dashed line 1035.

Figure 11:
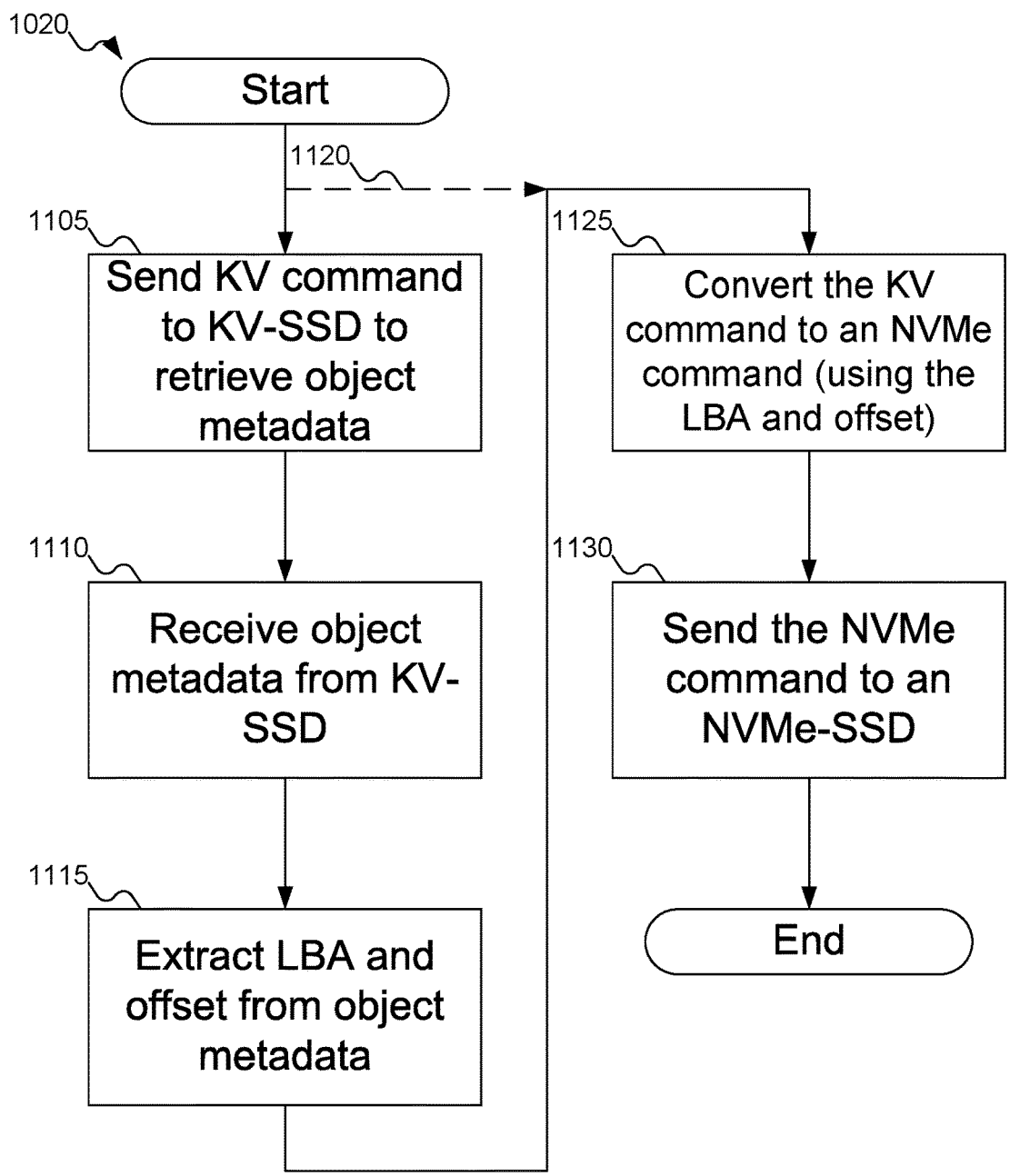
FIG. 11 shows a flowchart of an example procedure to convert a KV command to an NVMe command, according to an embodiment of the inventive concept.

In block 1020, if the storage device is KV-SSD 130-1 of FIG. 1, then the storage device may process KV command 615 of FIG. 6 natively. But if the storage device is NVMe-SSD 135-1 of FIG. 1, then translation from KV command 615 of FIG. 6 to NVMe command 625 of FIG. 6 may be performed. FIG. 11 shows a flowchart of an example procedure to convert KV command 615 of FIG. 6 to NVMe command 625 of FIG. 6, according to an embodiment of the inventive concept.

In FIG. 11, at block 1105, KV command 615 of FIG. 6 may be sent to KV-SSD 130-1 of FIG. 1 to retrieve object metadata 510 of FIG. 5. At block 1110, KV-NVMe translator 620 of FIG. 6 may receive object metadata 510 of FIG. 5, and at block 1115, KV-NVMe translator 620 of FIG. 6 may extract LBA 630 of FIG. 6 and offset 635 of FIG. 6 from object metadata 510 of FIG. 5. Blocks 1105-1115 may be omitted if object metadata 510 of FIG. 5 does not need to be retrieved, as shown by dashed arrow 1120. At block 1125, KV-NVMe translator 620 of FIG. 6 may convert KV command 615 of FIG. 6 into NVMe command 625 of FIG. 6 by constructing an NVMe command using LBA 630 of FIG. 6 and offset 635 of FIG. 6. Finally, at block 1130, KV-NVMe translator 620 of FIG. 6 may send NVMe command 625 of FIG. 6 to NVMe-SSD 135-1 of FIG. 1.

Figure 12:
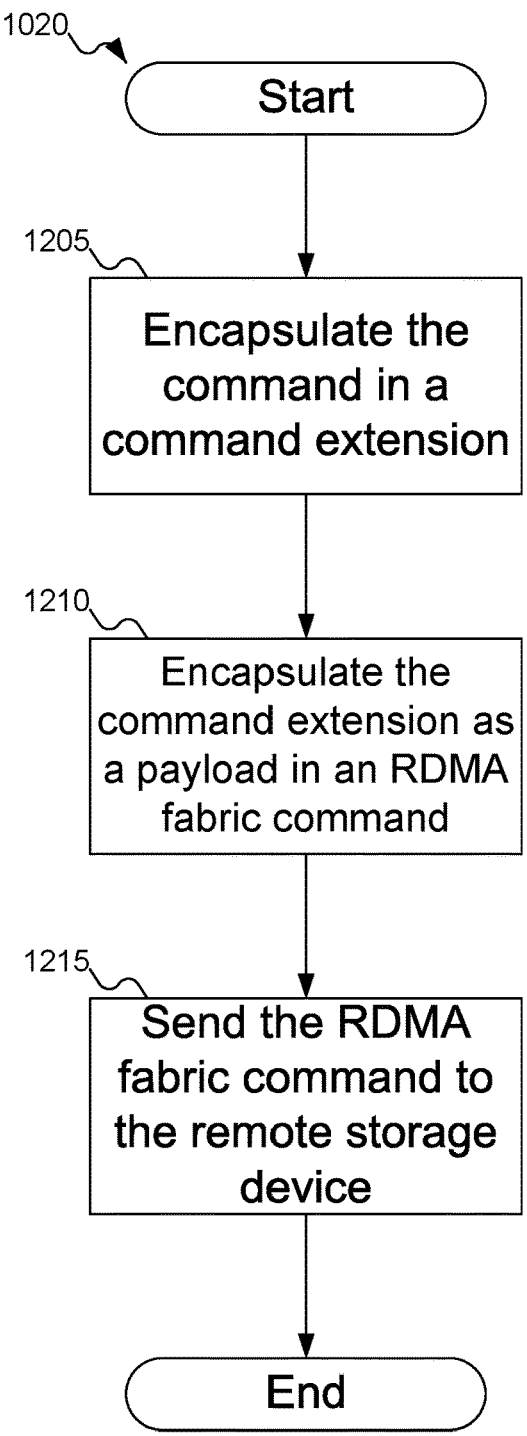
FIG. 12 shows a flowchart of an example procedure to encapsulate a KV command for transmission over a fabric, according to an embodiment of the inventive concept.

FIG. 12 shows a flowchart of an example procedure to encapsulate KV command 615 of FIG. 6 for transmission over a fabric, according to an embodiment of the inventive concept. In FIG. 12, at block 1205, encapsulation module 410 of FIG. 4 may receive KV command 615 of FIG. 6. At block 1210, encapsulation module 410 of FIG. 4 may encapsulate KV command 615 of FIG. 6 in command extension 805 of FIG. 8, which may be an extended NVMe command or a vendor-specific command, among other possibilities. Command extension 805 of FIG. 8 may then be encapsulated as payload 810 of FIG. 8 in RDMA fabric command 815 of FIG. 8. At block 1205, transmitter 420 of FIG. 4 may then transmit RDMA fabric command 815 of FIG. 8 to another computer system, such as computer system 110-2 of FIG. 1.

Figure 13:
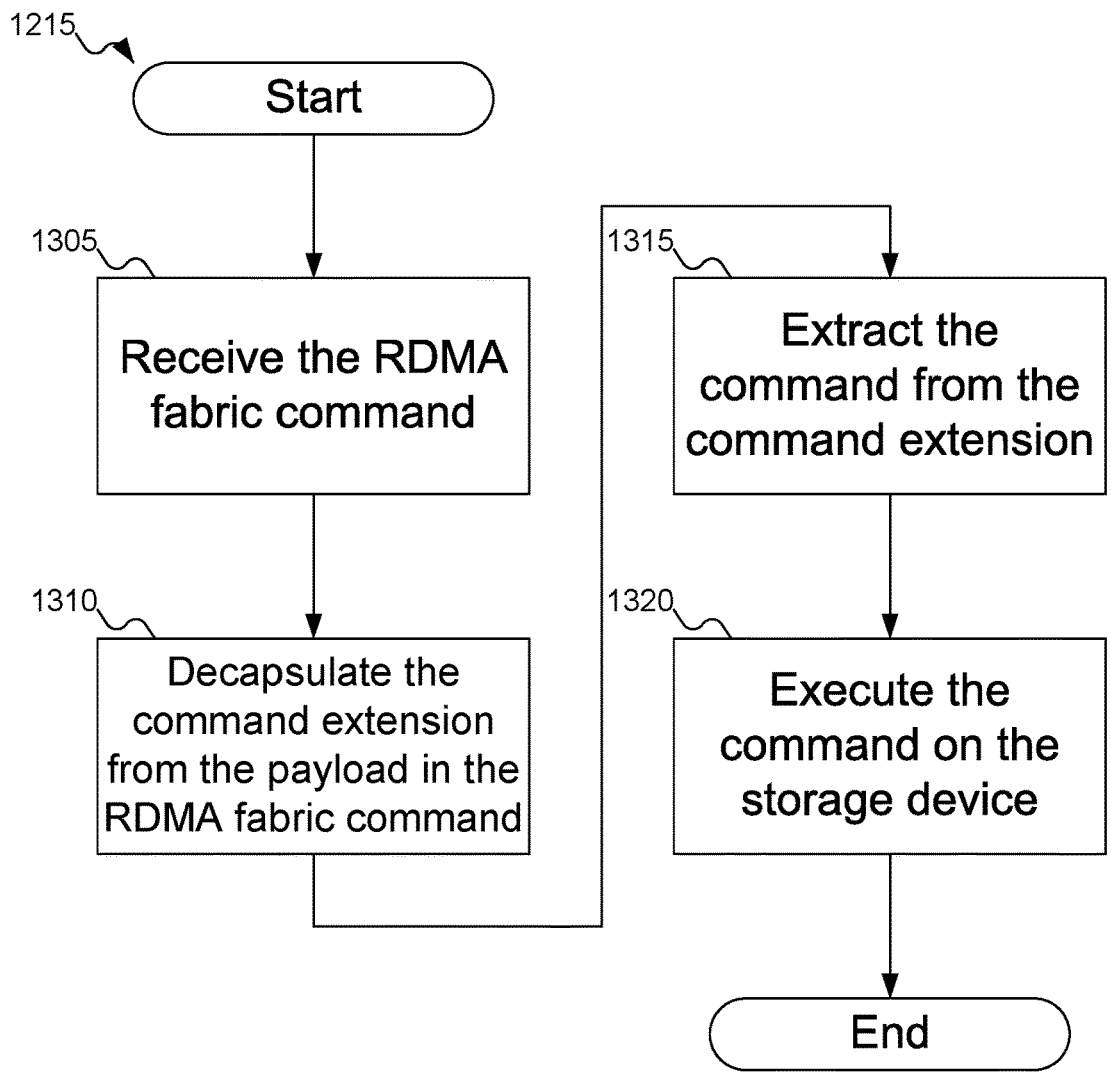
FIG. 13 shows a flowchart of an example procedure to decapsulate a KV command transmitted over a fabric, according to an embodiment of the inventive concept.

FIG. 13 shows a flowchart of an example procedure to decapsulate KV command 615 of FIG. 6 transmitted over a fabric, according to an embodiment of the inventive concept. In FIG. 13, at block 1305, receiver 425 of FIG. 4 may receive RDMA fabric command 815 of FIG. 8 from another computer system, such as computer system 110-2 of FIG. 1. At block 1310, decapsulation module 415 of FIG. 4 may extract command extension 805 of FIG. 8 from payload 810 of FIG. 8 of RDMA fabric command 815 of FIG. 8. At block 1315, decapsulation module 415 of FIG. 4 may extract KV command 615 of FIG. 6 from command extension 805 of FIG. 8. Finally, at block 1320, computer system 110-1 of FIG. 1 may execute KV command 615 of FIG. 6 on an appropriate storage device. Note that if the appropriate storage device is an NVMe storage device, such as NVMe-SSD 135-1, executing KV command 615 of FIG. 6 may involve translating KV command 615 of FIG. 6 into NVMe command 625 of FIG. 6, as described above.

In FIGS. 10-13, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer several advantages over conventional storage systems. Conventional backend storage systems use hard disk drives to store data, which require a complex input/output path to respond to object commands, and do not scale well for object requests. Embodiments of the inventive concept, on the other hand, easily manage object requests without complications, and easily scale up with added storage devices. Accessing object data or object metadata from KV-SSDs is simple based on hashing the object ID. And if the object data is stored on NVMe-SSDs, the object data may be split across multiple storage devices, overcoming the limitation of the physical size of any single storage device for objects: object metadata may indicate where all the portions of the object data are stored.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a system, comprising:
a computer system including:
  a processor executing instructions of an application, the application accessing an object using an object command;
  a memory storing the instructions of the application; and
  a conversion module to convert the object command to a key-value (KV) command; and
at least one storage device storing data for the object and processing the object using the KV command.

Statement 2. An embodiment of the inventive concept includes a system according to statement 1, wherein the computer system further includes the at least one storage device.

Statement 3. An embodiment of the inventive concept includes a system according to statement 2, wherein:
the at least one storage device storing data for the object includes a KV-Solid State Drive (SSD); and
the computer system is operative to transmit the KV command to the KV-SSD.

Statement 4. An embodiment of the inventive concept includes a system according to statement 2, wherein:
the at least one storage device storing data for the object includes a Non-Volatile Memory Express (NVMe)-SSD;
the conversion module includes a KV-NVMe translator to convert the KV command to an NVMe command using a Logical Block Address (LBA) and an offset for the object; and
the computer system is operative to transmit the NVMe command to the NVMe-SSD.

Statement 5. An embodiment of the inventive concept includes a system according to statement 4, wherein:
the at least one storage device storing the object further includes a KV-SSD storing metadata for the object; and
the KV-NVMe translator is operative to access the LBA and the offset for the object from the metadata for the object from the KV-SSD.

Statement 6. An embodiment of the inventive concept includes a system according to statement 11, wherein:
the at least one storage device storing data for the object further includes:
  a second KV-SSD storing second metadata for the object, the second metadata for the object including a second LBA and a second offset; and
  a second NVMe-SSD storing second data for the object;
the KV-NVMe translator is further operative to convert the KV command to a second NVMe command using the second LBA and the second offset for the object; and
the computer system is operative to transmit the second NVMe command to the second NVMe-SSD.

Statement 7. An embodiment of the inventive concept includes a system according to statement 6, wherein the object is larger than may be stored on either the NVMe-SSD or the second NVMe-SSD.

Statement 8. An embodiment of the inventive concept includes a system according to statement 1, wherein:
the computer system further includes:
  an encapsulation module to encapsulate the KV command in a command extension and to insert the command extension as a payload in a Remote Direct Memory Access (RDMA) fabric command;
  a first transmitter to transmit the RDMA fabric command to a second computer system; and
  a first receiver to receive the data for the object from the second computer system; and
the system further comprises the second computer system including:
  the at least one storage device;
  a second receiver to receive the RDMA fabric command;
  a decapsulation module to recover the KV command from the command extension in the payload of the RDMA fabric command; and
  a second transmitter to transmit the data for the object to the computer system.

Statement 9. An embodiment of the inventive concept includes a system according to statement 8, wherein:
the at least one storage device storing data for the object includes a KV-SSD; and
the second computer system is operative to transmit the KV command to the KV-SSD.

Statement 10. An embodiment of the inventive concept includes a system according to statement 8, wherein:
the at least one storage device storing data for the object includes an NVMe-SSD;
the system further includes a KV-NVMe translator to convert the KV command to an NVMe command using an LBA and an offset for the object; and
the second computer system is operative to transmit the NVMe command to the NVMe-SSD.

Statement 11. An embodiment of the inventive concept includes a system according to statement 10, wherein:
the system further comprises a KV-SSD storing metadata for the object, the metadata for the object including the LBA and the offset for the object;
the KV-NVMe translator is operative to access the LBA and the offset for the object from the metadata for the object from the KV-SSD;
the encapsulation module is operative to encapsulate the NVMe command in a command extension and to insert the command extension as a payload in an RDMA fabric command; and the decapsulation module is operative to recover the NVMe command from the command extension in the payload of the RDMA fabric command.

Statement 12. An embodiment of the inventive concept includes a system according to statement 11, wherein:

the system further comprises a second KV-SSD storing second metadata for the object, the second metadata for the object including a second LBA and a second offset for the object on a second NVMe-SSD;

the at least one storage device storing data for the object further includes the second NVMe-SSD;

the KV-NVMe translator is further operative to access the second LBA and the second offset for the object from the second metadata for the object from the second KV-SSD;

the encapsulation module is further operative to encapsulate a second NVMe command using the second LBA and the second offset for the object in a second command extension and to insert the second command extension as a second payload in a second RDMA fabric command;

the second computer system is operative to transmit the second NVMe command to the second NVMe-SSD; and the decapsulation module is further operative to recover the second NVMe command from the second command extension in the second payload of the second RDMA fabric command.

Statement 13. An embodiment of the inventive concept includes a system according to statement 12, wherein the object is larger than may be stored on either the NVMe-SSD or the second NVMe-SSD.

Statement 14. An embodiment of the inventive concept includes a system according to statement 11, wherein the computer system further includes the KV-SSD.

Statement 15. An embodiment of the inventive concept includes a system according to statement 11, wherein:

the encapsulation module is operative to encapsulate a second KV command in a second command extension and to insert the second command extension as a second payload in a second RDMA fabric command;

the first transmitter is operative to transmit the second RDMA fabric command to a third computer system; and the system further comprises the third computer system including:
 the KV-SSD;
 a third receiver to receive the second RDMA fabric command;
 a second decapsulation module to recover the second KV command from the second command extension in the second payload of the second RDMA fabric command; and
 a third transmitter to transmit the LBA and the offset for the object to the computer system; and
 the third computer system operative to use the second KV command to access the LBA and the offset for the object from the KV-SSD.

Statement 16. An embodiment of the inventive concept includes a system according to statement 15, wherein:
 the second computer system is the third computer system;
 the second receiver is the third receiver; and
 the second transmitter is the third transmitter.

Statement 17. An embodiment of the inventive concept includes a method, comprising:

receiving an object command from an application running on a processor, the object command relating to an object;

converting the object command to a key-value (KV) command; and sending the KV command to a storage device storing data for the object.

Statement 18. An embodiment of the inventive concept includes a method according to statement 17, wherein converting the object command to a KV command includes hashing an object identifier (ID) for the object to generate a key.

Statement 19. An embodiment of the inventive concept includes a method according to statement 18, wherein hashing an object ID for the object to generate a key includes hashing the object ID and a path to the object, the path to the object including at least one of a container and an account to generate the key.

Statement 20. An embodiment of the inventive concept includes a method according to statement 17, further comprising:

receiving the data for the object from the storage device; and forwarding the data for the object to the application.

Statement 21. An embodiment of the inventive concept includes a method according to statement 17, wherein sending the KV command to a storage device storing the object includes sending the KV command to a KV-SSD local to the processor, the KV-SSD storing the data for the object.

Statement 22. An embodiment of the inventive concept includes a method according to statement 17, wherein sending the KV command to a storage device storing the object includes:

converting the KV command to a Non-Volatile Memory Express (NVMe) command, the NVMe command including a Logical Block Address (LBA) and an offset for the object; and sending the NVMe command to an NVMe-SSD local to the processor, the NVMe-SSD storing the data for the object.

Statement 23. An embodiment of the inventive concept includes a method according to statement 22, wherein converting the KV command to a Non-Volatile Memory Express (NVMe) command includes:

sending the KV command to a KV-SSD local to the processor, the KV-SSD storing metadata for the object, the metadata for the object including the LBA and the offset for the object;

receiving the LBA and the offset from the KV-SSD; and constructing the NVMe command using the LBA and the offset for the object.

Statement 24. An embodiment of the inventive concept includes a method according to claim 19, wherein sending the KV command to a KV-SSD local to the processor, the KV-SSD storing the data for the object further includes:

sending a second KV command to a second KV-SSD local to the processor, the second KV-SSD storing second metadata for the object, the second metadata for the object including a second LBA and a second offset for the object;

receiving the second LBA and the second offset from the second KV-SSD;

constructing a second NVMe command using the second LBA and the second offset for the object; and sending the second NVMe command to a second NVMe-SSD local to the processor, the NVMe-SSD storing second data for the object.

Statement 25. An embodiment of the inventive concept includes a method according to statement 24, wherein the object is larger than may be stored on either the NVMe-SSD or the second NVMe-SSD.

Statement 26. An embodiment of the inventive concept includes a method according to statement 17, wherein sending the KV command to a storage device storing the object includes:

encapsulating the KV command in a command extension;

encapsulating the command extension as a payload in a Remote Direct Memory Access (RDMA) fabric command; and sending the KV command to a KV-SSD in a computer system remote from the processor, the KV-SSD storing the data for the object.

Statement 27. An embodiment of the inventive concept includes a method according to statement 26, wherein sending the KV command to a storage device storing the object further includes:

decapsulating the KV command from the command extension in the payload of the RDMA fabric command on the computer system remote from the processor; and executing the KV command on the KV-SSD in the computer system remote from the processor.

Statement 28. An embodiment of the inventive concept includes a method according to statement 17, wherein sending the KV command to a storage device storing the object includes:

encapsulating the KV command in a command extension;

encapsulating the command extension as a payload in an RDMA fabric command; and sending the RDMA fabric command to an NVMe-SSD in a computer system remote from the processor, the NVMe-SSD storing the data for the object.

Statement 29. An embodiment of the inventive concept includes a method according to statement 28, wherein sending the KV command to a storage device storing the object further includes:

decapsulating the KV command from the command extension in the payload of the RDMA fabric command on the computer system remote from the processor;

constructing an NVMe command from the KV command; and executing the NVMe command on the NVMe-SSD in the computer system remote from the processor.

Statement 30. An embodiment of the inventive concept includes a method according to statement 28, wherein encapsulating the KV command in a command extension includes:

sending the KV command to a KV-SSD local to the processor, the KV-SSD storing metadata for the object, the metadata for the object including an LBA and an offset for the object;

receiving the LBA and the offset from the KV-SSD; and constructing an NVMe command using the LBA and the offset for the object; and encapsulating the NVMe command using the LBA and the offset for the object in the command extension.

Statement 31. An embodiment of the inventive concept includes a method according to statement 30, wherein sending the KV command to a storage device storing the object further includes:

sending a second KV command to a second KV-SSD local to the processor, the second KV-SSD storing second metadata for the object, the second metadata for the object including a second LBA and a second offset for the object;

receiving the second LBA and the second offset from the second KV-SSD; and constructing a second NVMe command using the second LBA and the second offset for the object;

encapsulating the second NVMe command using the second LBA and the second offset for the object in a second command extension;

encapsulating the second command extension as a second payload in a second RDMA fabric command; and sending the second RDMA fabric command to a second NVMe-SSD in the computer system remote from the processor, the second NVMe-SSD storing second data for the object.

Statement 32. An embodiment of the inventive concept includes a method according to statement 31, wherein the object is larger than may be stored on either the NVMe-SSD or the second NVMe-SSD.

Statement 33. An embodiment of the inventive concept includes a method according to statement 28, wherein encapsulating the KV command in a command extension includes:

encapsulating the KV command in a second command extension;

encapsulating the second command extension as a second payload in a second RDMA fabric command;

sending the second RDMA fabric command to a KV-SSD in a second computer system remote from the processor, the KV-SSD storing metadata for the object, the metadata for the object including an LBA and an offset for the object;

receiving the LBA and the offset from the KV-SSD in the second computer system remote from the processor;

constructing an NVMe command using the LBA and the offset for the object; and encapsulating the NVMe command using the LBA and the offset for the object in the command extension.

Statement 34. An embodiment of the inventive concept includes an article, comprising a non-transitory storage medium, the non-transitory storage medium having stored thereon instructions that, when executed by a machine, result in:

receiving an object command from an application running on a processor, the object command relating to an object;

converting the object command to a key-value (KV) command; and sending the KV command to a storage device storing data for the object.

Statement 35. An embodiment of the inventive concept includes an article according to statement 34, wherein converting the object command to a KV command includes hashing an object identifier (ID) for the object to generate a key.

Statement 36. An embodiment of the inventive concept includes an article according to statement 35, wherein hashing an object ID for the object to generate a key includes hashing the object ID and a path to the object, the path to the object including at least one of a container and an account to generate the key.

Statement 37. An embodiment of the inventive concept includes an article according to statement 34, the non-transitory storage medium having stored thereon further instructions that, when executed by the machine, result in:

receiving the data for the object from the storage device; and forwarding the data for the object to the application.

Statement 38. An embodiment of the inventive concept includes an article according to statement 34, wherein sending the KV command to a storage device storing the object includes sending the KV command to a KV-SSD local to the processor, the KV-SSD storing the data for the object.

Statement 39. An embodiment of the inventive concept includes an article according to statement 34, wherein sending the KV command to a storage device storing the object includes:

converting the KV command to a Non-Volatile Memory Express (NVMe) command, the NVMe command including a Logical Block Address (LBA) and an offset for the object; and sending the NVMe command to an NVMe-SSD local to the processor, the NVMe-SSD storing the data for the object.

Statement 40. An embodiment of the inventive concept includes an article according to statement 39, wherein converting the KV command to a Non-Volatile Memory Express (NVMe) command includes:

sending the KV command to a KV-SSD local to the processor, the KV-SSD storing metadata for the object, the metadata for the object including the LBA and the offset for the object;

receiving the LBA and the offset from the KV-SSD; and constructing the NVMe command using the LBA and the offset for the object.

Statement 41. An embodiment of the inventive concept includes an article according to claim 32, wherein sending the KV command to a KV-SSD local to the processor, the KV-SSD storing the data for the object further includes:

sending a second KV command to a second KV-SSD local to the processor, the second KV-SSD storing second metadata for the object, the second metadata for the object including a second LBA and a second offset for the object;

receiving the second LBA and the second offset from the second KV-SSD;

constructing a second NVMe command using the second LBA and the second offset for the object; and sending the second NVMe command to a second NVMe-SSD local to the processor, the NVMe-SSD storing second data for the object.

Statement 42. An embodiment of the inventive concept includes an article according to statement 41, wherein the object is larger than may be stored on either the NVMe-SSD or the second NVMe-SSD.

Statement 43. An embodiment of the inventive concept includes an article according to statement 34, wherein sending the KV command to a storage device storing the object includes:

encapsulating the KV command in a command extension;

encapsulating the command extension as a payload in a Remote Direct Memory Access (RDMA) fabric command; and sending the KV command to a KV-SSD in a computer system remote from the processor, the KV-SSD storing the data for the object.

Statement 44. An embodiment of the inventive concept includes an article according to statement 43, wherein sending the KV command to a storage device storing the object further includes:

decapsulating the KV command from the command extension in the payload of the RDMA fabric command on the computer system remote from the processor; and executing the KV command on the KV-SSD in the computer system remote from the processor.

Statement 45. An embodiment of the inventive concept includes an article according to statement 34, wherein sending the KV command to a storage device storing the object includes:

encapsulating the KV command in a command extension;

encapsulating the command extension as a payload in an RDMA fabric command; and sending the RDMA fabric command to an NVMe-SSD in a computer system remote from the processor, the NVMe-SSD storing the data for the object.

Statement 46. An embodiment of the inventive concept includes an article according to statement 45, wherein sending the KV command to a storage device storing the object further includes:

decapsulating the KV command from the command extension in the payload of the RDMA fabric command on the computer system remote from the processor;

constructing an NVMe command from the KV command; and executing the NVMe command on the NVMe-SSD in the computer system remote from the processor.

Statement 47. An embodiment of the inventive concept includes an article according to statement 45, wherein encapsulating the KV command in a command extension includes:

sending the KV command to a KV-SSD local to the processor, the KV-SSD storing metadata for the object, the metadata for the object including an LBA and an offset for the object;

receiving the LBA and the offset from the KV-SSD; and constructing an NVMe command using the LBA and the offset for the object; and encapsulating the NVMe command using the LBA and the offset for the object in the command extension.

Statement 48. An embodiment of the inventive concept includes an article according to statement 47, wherein sending the KV command to a storage device storing the object further includes:

sending a second KV command to a second KV-SSD local to the processor, the second KV-SSD storing second metadata for the object, the second metadata for the object including a second LBA and a second offset for the object;

receiving the second LBA and the second offset from the second KV-SSD; and constructing a second NVMe command using the second LBA and the second offset for the object;

encapsulating the second NVMe command using the second LBA and the second offset for the object in a second command extension;

encapsulating the second command extension as a second payload in a second RDMA fabric command; and sending the second RDMA fabric command to a second NVMe-SSD in the computer system remote from the processor, the second NVMe-SSD storing second data for the object.

Statement 49. An embodiment of the inventive concept includes an article according to statement 48, wherein the object is larger than may be stored on either the NVMe-SSD or the second NVMe-SSD.

Statement 50. An embodiment of the inventive concept includes an article according to statement 45, wherein encapsulating the KV command in a command extension includes:

encapsulating the KV command in a second command extension;

encapsulating the second command extension as a second payload in a second RDMA fabric command;

sending the second RDMA fabric command to a KV-SSD in a second computer system remote from the processor, the KV-SSD storing metadata for the object, the metadata for the object including an LBA and an offset for the object;

receiving the LBA and the offset from the KV-SSD in the second computer system remote from the processor;

constructing an NVMe command using the LBA and the offset for the object; and encapsulating the NVMe command using the LBA and the offset for the object in the command extension.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A system, comprising:
a processor executing instructions of an application, the application accessing an object using a command;
a memory storing the instructions of the application;
a processing module to generate a key-value (KV) command based on the command and associate the KV command with a fabric command; and
at least one storage device storing data for the object and processing the object using the KV command.

2. A system according to claim 1, wherein:
the at least one storage device storing data for the object includes a KV-Solid State Drive (SSD); and
the system is operative to transmit the KV command to the KV-SSD.

3. A system according to claim 1, wherein:
the at least one storage device storing data for the object includes a Non-Volatile Memory Express (NVMe)-SSD;
the processing module includes a KV-NVMe translator to generate an NVMe command using the KV command, a Logical Block Address (LBA) and an offset for the object; and
the system is operative to transmit the NVMe command to the NVMe-SSD.

4. A system according to claim 3, wherein:
the at least one storage device storing the object further includes a KV-SSD storing metadata for the object; and
the KV-NVMe translator is operative to access the LBA and the offset for the object from the metadata for the object from the KV-SSD.

5. A system according to claim 1, wherein:
the system further includes:
a first transmitter to transmit the fabric command to a second system; and
a first receiver to receive the data for the object from the second system; and
the system further comprises the second system including:
the at least one storage device;
a second receiver to receive the fabric command;
a second processing module to recover the KV command from the fabric command; and
a second transmitter to transmit the data for the object to the system.

6. A system according to claim 5, wherein:
the at least one storage device storing data for the object includes a KV-SSD; and
the second system is operative to transmit the KV command to the KV-SSD.

7. A system according to claim 5, wherein:
the at least one storage device storing data for the object includes an NVMe-SSD;
the system further includes a KV-NVMe translator to generate an NVMe command using the KV command, an LBA and an offset for the object; and
the second system is operative to transmit the NVMe command to the NVMe-SSD.

8. A system according to claim 7, wherein:
the system further comprises a KV-SSD storing metadata for the object, the metadata for the object including the LBA and the offset for the object;
the KV-NVMe translator is operative to access the LBA and the offset for the object from the metadata for the object from the KV-SSD;
an association module associate the NVMe command and to insert in a fabric command; and
a recovery module recovers the NVMe command from the fabric command.

9. A method, comprising:
receiving a command from an application running on a processor, the command relating to an object;
generating a key-value (KV) command based on the command;
associating the KV command with a fabric command; and
sending the fabric command to a storage device storing data for the object.

10. A method according to claim 9, wherein generating a KV command includes hashing an object identifier (ID) for the object to generate a key.

11. A method according to claim 9, wherein sending the fabric command to a storage device storing the object includes sending the fabric command to a KV-SSD in a system remote from the processor, the KV-SSD storing the data for the object.

12. A method according to claim 11, wherein sending the fabric command to a storage device storing the object further includes:
recovering the KV command from the fabric command on the system remote from the processor; and
executing the KV command on the KV-SSD in the system remote from the processor.

13. A method according to claim 9, wherein sending the fabric command to a storage device storing the object includes sending the fabric command to an NVMe-SSD in a system remote from the processor, the NVMe-SSD storing the data for the object.

14. A method according to claim 13, wherein sending the KV command to a storage device storing the object further includes:
recovering the KV command from the fabric command on the system remote from the processor;
constructing an NVMe command from the KV command; and
executing the NVMe command on the NVMe-SSD in the system remote from the processor.

15. A method according to claim 13, wherein associating the KV command with a fabric command includes:
sending the KV command to a KV-SSD local to the processor, the KV-SSD storing metadata for the object, the metadata for the object including an LBA and an offset for the object;
receiving the LBA and the offset from the KV-SSD; and
constructing an NVMe command using the LBA and the offset for the object; and
associating the NVMe command with the fabric command.

16. A method according to claim 13, wherein associating the KV command with a fabric command includes:
associating the KV command with a second fabric command;
sending the second fabric command to a KV-SSD in a second system remote from the processor, the KV-SSD storing metadata for the object, the metadata for the object including an LBA and an offset for the object;

receiving the LBA and the offset from the KV-SSD in the second system remote from the processor;

constructing an NVMe command using the LBA and the offset for the object; and associating the NVMe command with the fabric command.

17. An article, comprising a non-transitory storage medium, the non-transitory storage medium having stored thereon instructions that, when executed by a machine, result in:

receiving a command from an application running on a processor, the command relating to an object;

generating a key-value (KV) command based on the command;

associating the KV command with a fabric command; and sending the fabric command to a storage device storing data for the object.

18. An article according to claim 17, wherein sending the fabric command to a storage device storing the object includes sending the fabric command to a KV-SSD in a system remote from the processor, the KV-SSD storing the data for the object.

19. An article according to claim 17, wherein sending the fabric command to a storage device storing the object includes sending the fabric command to an NVMe-SSD in a system remote from the processor, the NVMe-SSD storing the data for the object.

* * * * *